(12) United States Patent
Kasahara

(10) Patent No.: US 10,871,446 B2
(45) Date of Patent: Dec. 22, 2020

(54) MEASUREMENT DEVICE, ELECTRONIC APPARATUS AND MEASUREMENT METHOD

(71) Applicant: Seiko Epson Corporation, Tokyo (JP)

(72) Inventor: Hideaki Kasahara, Matsumoto (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/454,114

(22) Filed: Jun. 27, 2019

(65) Prior Publication Data

US 2020/0003686 A1 Jan. 2, 2020

(30) Foreign Application Priority Data

Jun. 28, 2018 (JP) .................. 2018-122975

(51) Int. Cl.
*G01N 21/55* (2014.01)
*G01J 3/26* (2006.01)
*G01J 3/02* (2006.01)
*G01J 3/50* (2006.01)

(52) U.S. Cl.
CPC .............. *G01N 21/55* (2013.01); *G01J 3/027* (2013.01); *G01J 3/26* (2013.01); *G01J 3/501* (2013.01); *G01N 2021/555* (2013.01)

(58) Field of Classification Search
CPC combination set(s) only.
See application file for complete search history.

(56) References Cited

U.S. PATENT DOCUMENTS

| 2005/0219305 A1 | 10/2005 | Kikuchi et al. |
| 2006/0251408 A1* | 11/2006 | Konno .................. G01J 3/0291 396/14 |
| 2010/0309488 A1 | 12/2010 | Koyama et al. |
| 2013/0127946 A1* | 5/2013 | Kanai ...................... B41J 2/125 347/19 |
| 2014/0131561 A1* | 5/2014 | Bernhard .................. G01J 3/18 250/226 |
| 2015/0300577 A1* | 10/2015 | Van Bommel ............ F21K 9/64 362/84 |
| 2019/0130560 A1* | 5/2019 | Horowitz .............. G06T 7/0008 |

FOREIGN PATENT DOCUMENTS

| JP | 2005-315856 A | 11/2005 |
| JP | 2006-025359 A | 1/2006 |
| JP | 2010-282093 A | 12/2010 |
| JP | 2013-107269 A | 6/2013 |
| JP | 2017-020869 A | 1/2017 |
| JP | 2017-096650 A | 6/2017 |

\* cited by examiner

*Primary Examiner* — Maurice C Smith
(74) *Attorney, Agent, or Firm* — Harness, Dickey & Pierce, P.L.C.

(57) ABSTRACT

A measurement device includes a plurality of light sources configured to emit light toward a measurement object, and having a same emission spectrum, a spectroscopic measurement section configured to perform spectroscopic measurement on the light reflected by the measurement object, a light source switching section configured to switch a combination of the light sources to be put on or off out of the plurality of light sources, and an arithmetic section configured to calculate the spectral reflectivity of the measurement object based on a spectroscopic measurement result obtained by the spectroscopic measurement section when putting on or off the plurality of light sources with a plurality of the combinations.

7 Claims, 12 Drawing Sheets

FIG. 5

| LIGHT SOURCE COMBINATION | FIRST WHITE LIGHT SOURCE | SECOND WHITE LIGHT SOURCE | THIRD WHITE LIGHT SOURCE | ULTRAVIOLET LIGHT SOURCE |
|---|---|---|---|---|
| COMBINATION a | ON | OFF | OFF | OFF |
| COMBINATION b | OFF | ON | OFF | OFF |
| COMBINATION c | OFF | OFF | ON | OFF |
| COMBINATION d | ON | ON | ON | ON |

FIG. 6

| MEASUREMENT POSITION Pm | LIGHT SOURCE COMBINATION q | PARTIAL SPECTRAL REFLECTIVITY $x(Pm,[q],\lambda i)$ | | | | |
|---|---|---|---|---|---|---|
| | | $\lambda 1$ | $\lambda 2$ | $\lambda 3$ | ... | $\lambda n$ |
| P1 | a | $x(P1,a,\lambda 1)$ | $x(P1,a,\lambda 2)$ | $x(P1,a,\lambda 3)$ | ... | $x(P1,a,\lambda n)$ |
| | b | $x(P1,b,\lambda 1)$ | $x(P1,b,\lambda 2)$ | $x(P1,b,\lambda 3)$ | ... | $x(P1,b,\lambda n)$ |
| | c | $x(P1,c,\lambda 1)$ | $x(P1,c,\lambda 2)$ | $x(P1,c,\lambda 3)$ | ... | $x(P1,c,\lambda n)$ |
| P2 | a | $x(P2,a,\lambda 1)$ | $x(P2,a,\lambda 2)$ | $x(P2,a,\lambda 3)$ | ... | $x(P2,a,\lambda n)$ |
| | b | $x(P2,b,\lambda 1)$ | $x(P2,b,\lambda 2)$ | $x(P2,b,\lambda 3)$ | ... | $x(P2,b,\lambda n)$ |
| | c | $x(P2,c,\lambda 1)$ | $x(P2,c,\lambda 2)$ | $x(P2,c,\lambda 3)$ | ... | $x(P2,c,\lambda n)$ |
| P3 | a | $x(P3,a,\lambda 1)$ | $x(P3,a,\lambda 2)$ | $x(P3,a,\lambda 3)$ | ... | $x(P3,a,\lambda n)$ |
| | b | $x(P3,b,\lambda 1)$ | $x(P3,b,\lambda 2)$ | $x(P3,b,\lambda 3)$ | ... | $x(P3,b,\lambda n)$ |
| | c | $x(P3,c,\lambda 1)$ | $x(P3,c,\lambda 2)$ | $x(P3,c,\lambda 3)$ | ... | $x(P3,c,\lambda n)$ |
| P4 | a | $x(P4,a,\lambda 1)$ | $x(P4,a,\lambda 2)$ | $x(P4,a,\lambda 3)$ | ... | $x(P4,a,\lambda n)$ |
| | b | $x(P4,b,\lambda 1)$ | $x(P4,b,\lambda 2)$ | $x(P4,b,\lambda 3)$ | ... | $x(P4,b,\lambda n)$ |
| | c | $x(P4,c,\lambda 1)$ | $x(P4,c,\lambda 2)$ | $x(P4,c,\lambda 3)$ | ... | $x(P4,c,\lambda n)$ |

FIG. 7

| SPECTRAL REFLECTIVITY Aj | | | | | | | |
|---|---|---|---|---|---|---|---|
| A1 | A2 | A3 | ... | An | An+1 | An+2 | ... | Agn |
| $x_{av1}+3\sigma_1$ | $x_{av2}+3\sigma_2$ | $x_{av3}+3\sigma_3$ | ... | $x_{avn}+3\sigma_n$ | $x_{avn+1}-3\sigma_1$ | $x_{avn+2}-3\sigma_2$ | ... | $x_{avgn}-3\sigma_n$ |

FIG. 8

| TYPE OF MEDIUM | LOT SAMPLE | MEASUREMENT POSITION | LIGHT SOURCE COMBINATION | PARTIAL SPECTRAL REFLECTIVITY x([Pm][q],λi) | | | | |
|---|---|---|---|---|---|---|---|---|
| | | | | λ1 | λ2 | λ3 | ... | λn |
| T1 | L1 | P1 | a | x(T1,L1,P1,a,λ1) | x(T1,L1,P1,a,λ2) | x(T1,L1,P1,a,λ3) | ... | x(T1,L1,P1,a,λn) |
| | | | b | x(T1,L1,P1,b,λ1) | x(T1,L1,P1,b,λ2) | x(T1,L1,P1,b,λ3) | ... | x(T1,L1,P1,b,λn) |
| | | | c | x(T1,L1,P1,c,λ1) | x(T1,L1,P1,c,λ2) | x(T1,L1,P1,c,λ3) | ... | x(T1,L1,P1,c,λn) |
| | | P2 | a | x(T1,L1,P2,a,λ1) | x(T1,L1,P2,a,λ2) | x(T1,L1,P2,a,λ3) | ... | x(T1,L1,P2,a,λn) |
| | | | b | x(T1,L1,P2,b,λ1) | x(T1,L1,P2,b,λ2) | x(T1,L1,P2,b,λ3) | ... | x(T1,L1,P2,b,λn) |
| | | | c | x(T1,L1,P2,c,λ1) | x(T1,L1,P2,c,λ2) | x(T1,L1,P2,c,λ3) | ... | x(T1,L1,P2,c,λn) |
| | | P3 | a | x(T1,L1,P3,a,λ1) | x(T1,L1,P3,a,λ2) | x(T1,L1,P3,a,λ3) | ... | x(T1,L1,P3,a,λn) |
| | | | b | x(T1,L1,P3,b,λ1) | x(T1,L1,P3,b,λ2) | x(T1,L1,P3,b,λ3) | ... | x(T1,L1,P3,b,λn) |
| | | | c | x(T1,L1,P3,c,λ1) | x(T1,L1,P3,c,λ2) | x(T1,L1,P3,c,λ3) | ... | x(T1,L1,P3,c,λn) |
| | | P4 | a | x(T1,L1,P4,a,λ1) | x(T1,L1,P4,a,λ2) | x(T1,L1,P4,a,λ3) | ... | x(T1,L1,P4,a,λn) |
| | | | b | x(T1,L1,P4,b,λ1) | x(T1,L1,P4,b,λ2) | x(T1,L1,P4,b,λ3) | ... | x(T1,L1,P4,b,λn) |
| | | | c | x(T1,L1,P4,c,λ1) | x(T1,L1,P4,c,λ2) | x(T1,L1,P4,c,λ3) | ... | x(T1,L1,P4,c,λn) |
| | | P5 | a | x(T1,L1,P5,a,λ1) | x(T1,L1,P5,a,λ2) | x(T1,L1,P5,a,λ3) | ... | x(T1,L1,P5,a,λn) |
| | | ... | ... | ... | ... | ... | ... | ... |
| | L2 | P1 | a | x(T1,L2,P1,a,λ1) | x(T1,L2,P1,a,λ2) | x(T1,L2,P1,a,λ3) | ... | x(T1,L2,P1,a,λn) |
| | ... | ... | ... | ... | ... | ... | ... | ... |
| T2 | L1 | P1 | a | x(T2,L1,P1,a,λ1) | x(T2,L1,P1,a,λ2) | x(T2,L1,P1,a,λ3) | ... | x(T2,L1,P1,a,λn) |
| | L2 | P1 | a | x(T2,L2,P1,a,λ1) | x(T2,L2,P1,a,λ2) | x(T2,L2,P1,a,λ3) | ... | x(T2,L2,P1,a,λn) |
| | ... | ... | ... | ... | ... | ... | ... | ... |

FIG. 9

| TYPE OF MEDIUM | LOT | SAMPLE | SPECTRAL REFLECTIVITY $A_j$ | | | | | | |
|---|---|---|---|---|---|---|---|---|---|
| | | | $A_1$ | $A_2$ | $A_3$ | ... | $A_n$ | $A_{n+1}$ | $A_{2n}$ |
| T1 | L1 | | $x_{ave}(T1,L1)+3\sigma_1(T1,L1)$ | $x_{ave}(T1,L1)+3\sigma_2(T1,L1)$ | $x_{ave}(T1,L1)+3\sigma_3(T1,L1)$ | ... | $x_{ave}(T1,L1)+3\sigma_n(T1,L1)$ | $x_{ave}(T1,L1)-3\sigma_1(T1,L1)$ | $x_{ave}(T1,L1)-3\sigma_n(T1,L1)$ |
| | L2 | | $x_{ave}(T1,L2)+3\sigma_1(T1,L2)$ | $x_{ave}(T1,L2)+3\sigma_2(T1,L2)$ | $x_{ave}(T1,L2)+3\sigma_3(T1,L2)$ | ... | $x_{ave}(T1,L2)+3\sigma_n(T1,L2)$ | $x_{ave}(T1,L2)-3\sigma_1(T1,L2)$ | $x_{ave}(T1,L2)-3\sigma_n(T1,L2)$ |
| | ... | | ... | ... | ... | ... | ... | ... | ... |
| T2 | L1 | | $x_{ave}(T1,L1)+3\sigma_1(T1,L1)$ | $x_{ave}(T1,L1)+3\sigma_2(T1,L1)$ | $x_{ave}(T1,L1)+3\sigma_3(T1,L1)$ | ... | $x_{ave}(T1,L1)+3\sigma_n(T1,L1)$ | $x_{ave}(T1,L1)-3\sigma_1(T1,L1)$ | $x_{ave}(T1,L1)-3\sigma_n(T1,L1)$ |
| | ... | | ... | ... | ... | ... | ... | ... | ... |
| ... | | | | | | | | | |

FIG. 10

| TYPE OF MEDIUM | AVERAGE REFLECTIVITY DATA | COVARIANCE DATA |
|---|---|---|
| T1 | $avA_{T1}$ | $R_{T1}$ |
| T2 | $avA_{T2}$ | $R_{T2}$ |
| ... | ... | ... |

FIG. 12

| LIGHT SOURCE COMBINATION | FIRST WHITE LIGHT SOURCE | SECOND WHITE LIGHT SOURCE | THIRD WHITE LIGHT SOURCE | FIRST ULTRAVIOLET LIGHT SOURCE | SECOND ULTRAVIOLET LIGHT SOURCE | THIRD ULTRAVIOLET LIGHT SOURCE |
|---|---|---|---|---|---|---|
| COMBINATION e | ON | OFF | OFF | ON | OFF | OFF |
| COMBINATION f | OFF | ON | OFF | OFF | ON | OFF |
| COMBINATION g | OFF | OFF | ON | OFF | OFF | ON |
| COMBINATION h | ON | ON | ON | OFF | OFF | OFF |

MEASUREMENT DEVICE, ELECTRONIC APPARATUS AND MEASUREMENT METHOD

The present application is based on, and claims priority from, JP Application Serial Number 2018-122975, filed Jun. 28, 2018, the disclosure of which is hereby incorporated by reference herein in its entirety.

BACKGROUND

1. Technical Field

The present disclosure relates to a measurement device, an electronic apparatus and a measurement method.

2. Related Art

In the past, there has been known a measurement device for performing spectroscopic measurement of a measurement object (see, e.g., JP-A-2013-107269 (Document 1)).

The printing device described in Document 1 is provided with a print medium discriminator (a measurement device). The print medium discriminator irradiates the print medium with light from a single light source, makes the light reflected by the print medium pass through a spectroscope, and then receives light with a predetermined wavelength having passed through the spectroscope with an optical sensor. Then, the print medium discriminator calculates the spectral reflectivity of the print medium from data of the light intensity detected by the optical sensor, and then further calculates a Mahalanobis' generalized distance to discriminate the type of the print medium.

However, in the device described in Document 1, since the measurement object (a printing medium) is irradiated by the light from a single light source, there is a problem that the light intensity of the reflected light varies due to the shape of the surface irregularity existing in the measurement object and so on, and there is caused a variation in the measurement result.

SUMMARY

A measurement device according to a first application example includes a plurality of light sources configured to emit light toward a measurement object, and having a same emission spectrum, a spectroscopic measurement section configured to perform a spectroscopic measurement on light reflected by the measurement object to obtain a spectroscopic measurement result, a light source switching section configured to switch a combination of the light sources to be put on or off out of the plurality of light sources, and an arithmetic section configured to calculate a spectral reflectivity of the measurement object based on the respective spectroscopic measurement results when switching the plurality of light sources with a plurality of the combinations.

In the measurement device according to the present application example, the arithmetic section may calculate a partial spectral reflectivity corresponding to the combination based on the spectroscopic measurement result corresponding to the combination, and may combine a plurality of the partial spectral reflectivities corresponding to a plurality of the combinations with each other to calculate the spectral reflectivity.

In the measurement device according to the present application example, the arithmetic section may define an average value of the partial spectral reflectivities xi with respect to a wavelength $\lambda i$ as $x_{avi}$, and a standard deviation of the partial spectral reflectivities xi with respect to the wavelength $\lambda i$ as $\varnothing_i$, and may calculate the spectral reflectivities with respect to the wavelength $\lambda i$ as $A_i = x_{avi} + k\sigma_i$, and $A_{i+n} = x_{avi} - k\sigma_i$.

In the measurement device according to the present application example, the arithmetic section may calculate the spectral reflectivity based on the respective spectroscopic measurement results obtained when switching the plurality of light sources with the plurality of combinations with respect to a plurality of measurement positions included in the measurement object.

In the measurement device according to the present application example, the plurality of combinations may include the combination of putting any one of the light sources on and putting the other of the light sources off.

An electronic apparatus according to a second application example includes the measurement device according to the first application example described above, and a type discrimination section configured to discriminate a type of the measurement object based on the spectral reflectivity measured by the measurement device.

A measurement method according to a third application example is a measurement method of a measurement device including a plurality of light sources configured to emit light toward a measurement object, and having a same emission spectrum, and a spectroscopic measurement section configured to perform a spectroscopic measurement on light reflected by the measurement object to obtain a spectroscopic measurement result, the method including the steps of switching a combination of the light sources to be put on out of the plurality of light sources, and calculating a spectral reflectivity of the measurement object based on the respective spectroscopic measurement results when switching the plurality of light sources with a plurality of the combinations.

BRIEF DESCRIPTION OF THE DRAWINGS

FIG. 5 is a diagram showing an example of patterns of a light source combination in the present embodiment.

FIG. 6 is a diagram showing an example of a partial spectral reflectivity calculated from a spectroscopic measurement result with respect to each wavelength.

FIG. 7 is a diagram showing an example of a spectral reflectivity obtained when combining the partial spectral reflectivities shown in FIG. 6 with each other.

FIG. 8 is a diagram showing an example of partial spectral reflectivities obtained from a plurality of sample media.

FIG. 9 is a diagram showing an example of a spectral reflectivity obtained when combining the partial spectral reflectivities shown in FIG. 8 with each other.

FIG. 10 is a diagram showing an example of sample data of the present embodiment.

FIG. 12 is a diagram showing another example of light source combination in Modified Example 2.

DESCRIPTION OF AN EXEMPLARY EMBODIMENT

An embodiment related to an electronic apparatus equipped with a measurement device will hereinafter be described.

Figure 1:
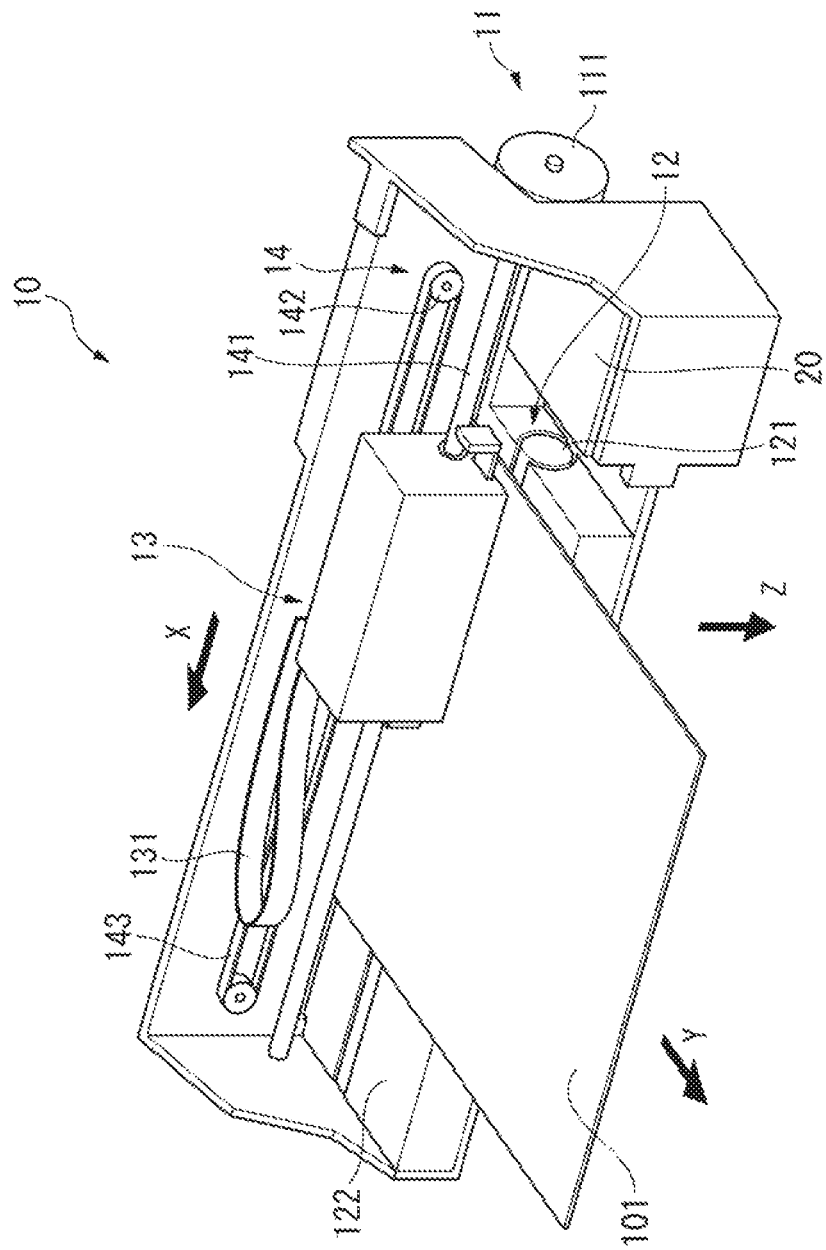
FIG. 1 is an external view showing a schematic configuration of a printer according to an embodiment.

In the present embodiment, the description will be presented illustrating a printer 10 as an example of the electronic apparatus. FIG. 1 is an external view showing a schematic configuration of the printer 10 according to the present embodiment. Further, FIG. 2 is a block diagram showing a schematic configuration of the printer 10 according to the present embodiment.

Figure 2:
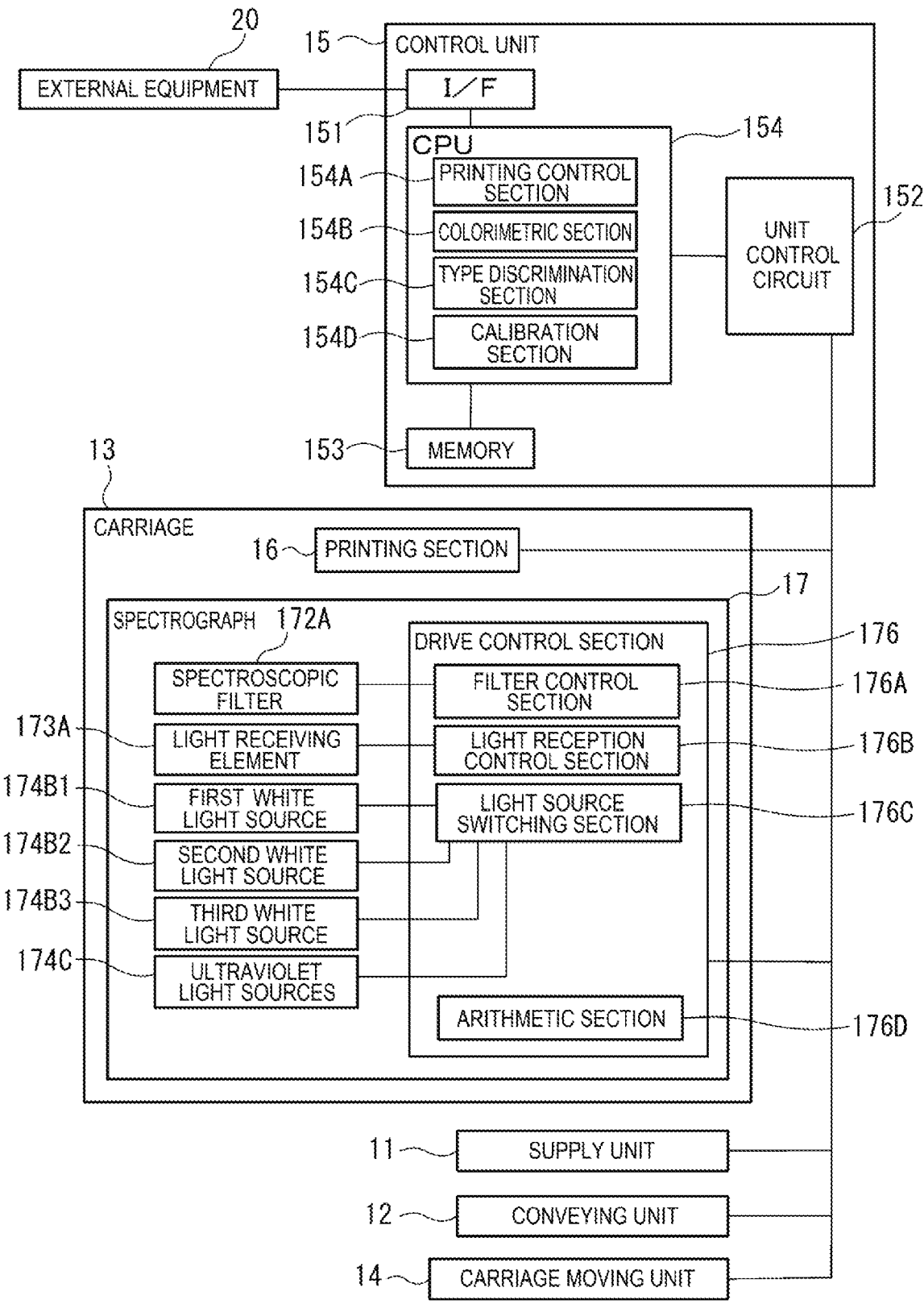
FIG. 2 is a block diagram showing a schematic configuration of the printer according to the present embodiment.

As shown in FIG. 1, the printer 10 is provided with a supply unit 11, a conveying unit 12, a carriage 13, a carriage moving unit 14, and a control unit 15 shown in FIG. 2. The printer 10 controls each of the units 11, 12, and 14 and the carriage 13 based on print data input from external equipment 20 such as a personal computer to print an image on a medium 101.

Further, in the printer 10 according to the present embodiment, the carriage 13 incorporates a spectrograph 17 as a measurement device. The spectrograph 17 performs a spectroscopic measurement of the medium 101 as the measurement object to measure the color of the medium 101. It should be noted that the medium 101 corresponds to the measurement object on which the spectroscopic measurement is performed by the spectrograph 17. Further, the spectrograph 17 discriminates the type of the medium 101 based on a result of the spectroscopic measurement. Thus, it is possible for the printer 10 to perform print processing on the medium 101 based on a printing profile corresponding to the type of the medium 101 thus discriminated.

Hereinafter, each of the constituents of the printer 10 will specifically be described.

The supply unit 11 is a unit for supplying the medium 101 to be an image formation target to an image formation position. The supply unit 11 is provided with, for example, a roll body 111 around which the medium 101 is wound, a roll driving motor not shown, and a roll driving gear train not shown. Further, by the roll driving motor being rotationally driven based on a command from the control unit 15, the roll body 111 rotates via the roll driving gear train, and thus, the paper wound around the roll body 111 is supplied on a downstream side (+Y side) in a sub-scanning direction (Y direction).

It should be noted that an example of supplying the paper wound around the roll body 111 is described in the present embodiment, but this is not a limitation. For example, it is also possible for the medium 101 to be supplied by any supply method such as a method of supplying the medium 101 such as a paper sheet mounted on a tray or the like, for example, one by one by a roller or the like.

The conveying unit 12 conveys the medium 101 supplied from the supply unit 11 along the Y direction. The conveying unit 12 is configured including, for example, a conveying roller 121, a driven roller not shown disposed across the medium 101 from the conveying roller 121 to be driven by the conveying roller 121, and a platen 122.

The conveying roller 121 is rotated by the conveying motor not shown being driven due to the control by the control unit 15, and conveys the medium 101 along the Y direction in the state of clamping the medium 101 between the conveying roller 121 and the driven roller. Further, on the +Y side of the conveying roller 121, there is disposed the platen 122 opposed to the carriage 13.

The carriage 13 is provided with a printing section 16 for printing an image to the medium 101, and the spectrograph 17 for performing spectroscopic measurement of a predetermined measurement position P on the medium 101.

The carriage 13 is disposed so as to be movable along a main scanning direction (X direction) crossing the Y direction due to the carriage moving unit 14. Further, the carriage 13 is connected to the control unit 15 by a flexible circuit 131, and performs the print processing by the printing section 16, and spectroscopic measurement processing by the spectrograph 17 based on a command from the control unit 15.

It should be noted that the detailed configuration of the printing section 16 and the spectrograph 17 provided to the carriage 13 will be described later.

The carriage moving unit 14 reciprocates the carriage 13 along the X direction based on a command from the control unit 15. The carriage moving unit 14 is configured including, for example, a carriage guide shaft 141, a carriage motor 142, and a timing belt 143.

The carriage guide shaft 141 is disposed along the X direction, and both end parts of the carriage guide shaft 141 are fixed to, for example, a housing of the printer 10. The carriage motor 142 drives the timing belt 143. The timing belt 143 is supported roughly in parallel to the carriage guide shaft 141, and a part of the carriage 13 is fixed to the timing belt 143. Then, when the carriage motor 142 is driven based on the command of the control unit 15, the timing belt 143 is made to run forward and backward, and the carriage 13 fixed to the timing belt 143 reciprocates while being guided by the carriage guide shaft 141.

Then, the configuration of the printing section 16 and the spectrograph 17 provided to the carriage 13 will be described.

Configuration of Printing Section 16

The printing section 16 ejects ink from a part opposed to the medium 101 to form an image on the medium 101.

Although the detailed illustration of the printing section 16 is omitted, on the printing section 16, for example, ink cartridges corresponding respectively to a plurality of colors of ink are detachably mounted, and the ink is supplied from each of the ink cartridges to an ink tank via a tube. Further, at a position of the printing section 16 opposed to the medium 101, there are disposed nozzles for ejecting ink droplets so as to correspond to the respective colors. These nozzles are each provided with, for example, a piezoelectric element, and by driving the piezoelectric element, the ink droplet supplied from the ink tank is ejected and then lands in the medium 101, and thus a dot is formed.

Configuration of Spectrograph 17

Figure 3:
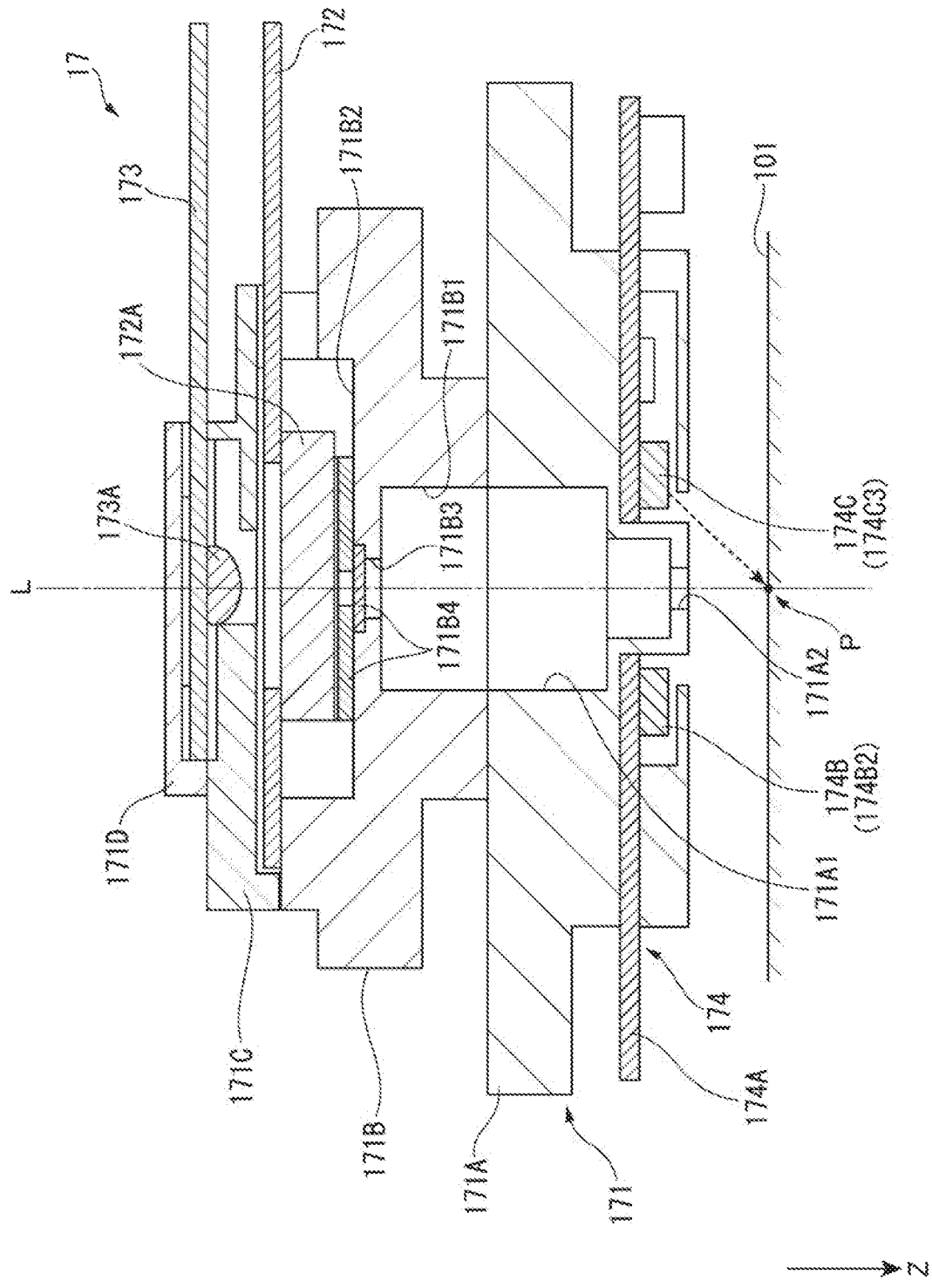
FIG. 3 is a cross-sectional view showing a schematic configuration of a spectrograph (a measurement device) according to the present embodiment.

FIG. 3 is a cross-sectional view showing a schematic configuration of the spectrograph 17.

As shown in FIG. 3, the spectrograph 17 is provided with a base 171, a filter holding substrate 172 to be fixed to the base 171, a light receiving element holding substrate 173 to be fixed to the base 171, and a light source section 174. Further, as shown in FIG. 2, the spectrograph 17 is provided with a drive control section 176 for controlling an operation of the spectrograph 17.

Configuration of Base 171

The base 171 is a member which is fixed to the carriage 13, and which holds the filter holding substrate 172, the light receiving element holding substrate 173 and the light source section 174. As shown in FIG. 3, the base 171 is provided with, for example, a first base section 171A, a second base section 171B, a third base section 171C and a fourth base section 171D.

The first base section 171A is fixed to the carriage 13, and is provided with a first introduction hole 171A1 through which light reflected by the medium 101 passes, and which is located at a position opposed to the measurement position P of the medium 101. The first introduction hole 171A1 is a hole section having a cylindrical inner peripheral surface having an axis parallel to the Z direction, and is provided with an incident window 171A2 which the light reflected by the medium 101 enters, and which is located on the +Z side. It should be noted that the axis of the first introduction hole 171A1 is an optical axis of a light receiving element 173A, and is hereinafter referred to as a measurement optical axis L.

Further, to a surface opposed to the medium 101 of the first base section 171A, namely a surface on the +Z side, there is provided the light source section 174 as shown in FIG. 3.

The second base section 171B is fixed to an opposite side of the first base section 171A to the medium 101. The second base section 171B is provided with a second introduction hole 171B1 communicated with the first introduction hole 171A1. The second introduction hole 171B1 is a hole section having a cylindrical inner peripheral surface coaxial with the first introduction hole 171A1.

To a surface on the −Z side of the second base section 171B, there is provided a recessed section 171B2. To a bottom surface of the recessed section 171B2, there is provided a pass hole 171B3 for communicating the recessed section 171B2 and the second introduction hole 171B1 with each other. The recessed section 171B2 forms a space for disposing an optical members 171B4 such as a bandpass filter and a lens, and a spectroscopic filter 172A, and forms a sealed space between the second base section 171B and the third base section 171C.

Further, to a surface on the −Z side of the second base section 171B, there is fixed the filter holding substrate 172 so as to cover the recessed section 171B2. The filter holding substrate 172 is provided with the spectroscopic filter 172A, and the spectroscopic filter 172A is disposed on the measurement optical axis L inside the recessed section 171B2.

The third base section 171C is fixed to the −Z side of the second base section 171B. To the third base section 171C, there is fixed the light receiving element holding substrate 173. As shown in FIG. 3, the third base section 171C has a through hole along the measurement optical axis L, and the light receiving element holding substrate 173 is fixed to the third base section 171C so that the light receiving element 173A provided to the light receiving element holding substrate 173 is disposed on the measurement optical axis L.

The fourth base section 171D is a cover member, and is disposed so as to cover the −Z side surface of the light receiving element holding substrate 173 fixed to the third base section 171C.

Further, light blocking members or the like respectively intervene between the third base section 171C and the second base section 171B, and between the third base section 171C and the fourth base section 171D to thereby prevent outside light from entering the light receiving element 173A.

It should be noted that in the present embodiment, there is described the example in which the incident window 171A2, the first introduction hole 171A1, the second introduction hole 171B1, the pass hole 171B3, the spectroscopic filter 172A and the light receiving element 173A are coaxially disposed, but this is not a limitation. For example, it is also possible for the spectroscopic filter 172A and the light receiving element 173A to be disposed on a different axis from that of the first introduction hole 171A1 or the second introduction hole 171B1, and it is also possible to make the light receiving element 173A receive the light reflected by, for example, the mirror and inputs through the incident window 171A2 via the spectroscopic filter 172A.

Configuration of Filter Holding Substrate 172

To the filter holding substrate 172, there is fixed the spectroscopic filter 172A. As the spectroscopic filter 172A, it is possible to use, for example, a variable wavelength interference filter having a pair of reflecting films, and varying the distance between the reflecting films to thereby vary the transmission wavelength. It should be noted that as the spectroscopic filter 172A, it is also possible to use a grating element, a liquid crystal tunable filter, an acousto-optical filter and so on besides the above.

Further, the filter holding substrate 172 can also be provided with a drive circuit or the like for driving the spectroscopic filter 172A.

Configuration of Light Receiving Element Holding Substrate 173

To the light receiving element holding substrate 173, there is fixed the light receiving element 173A. As the light receiving element 173A, for example, it is also possible to use an image sensor such as a charge coupled device (CCD), and it is also possible for the light receiving element 173A to be constituted by a single photodiode, or a plurality of photodiodes.

It should be noted that the spectroscopic measurement section is constituted by the spectroscopic filter 172A held by the filter holding substrate 172, and the light receiving element 173A held by the light receiving element holding substrate 173.

It is also possible for the light receiving element holding substrate 173 to incorporate a light receiving circuit or the like for processing a light receiving signal from the light receiving element 173A.

Configuration of Light Source Section 174

Figure 4:
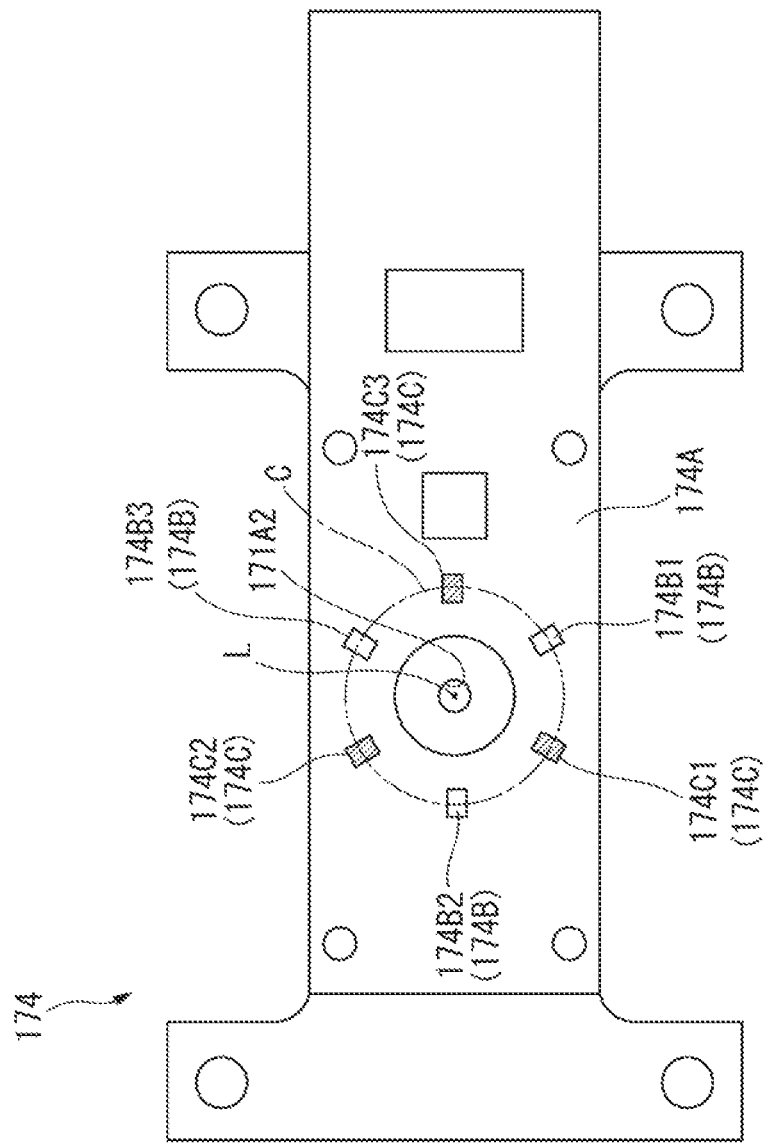
FIG. 4 is a plan view of a light source section of the present embodiment when viewed from a +Z side.

FIG. 4 is a plan view of the light source section 174 of the spectrograph 17 when viewed from the +Z side.

The light source section 174 is provided with a light source holding substrate 174A, a plurality of white light sources 174B and a plurality of ultraviolet light sources 174C held by the light source holding substrate 174A. The white light sources 174B and the ultraviolet light sources 174C are arranged at regular angular intervals along an imaginary circle C centered on the measurement optical axis L. Here, the white light sources 174B are light sources having the same emission spectrum.

In the present embodiment, as shown in FIG. 4, the three white light sources 174B, namely a first white light source 174B1, a second white light source 174B2 and a third white light source 174B3, are arranged at intervals of 120°. Further, the three ultraviolet light sources 174C, namely a first ultraviolet light source 174C1, a second ultraviolet light source 174C2 and a third ultraviolet light source 174C3, are arrange at intervals of 120°. These ultraviolet light sources 174C are each disposed between the two white light sources 174B adjacent to each other along the imaginary circle C. In other words, in the present embodiment, the white light sources 174B and the ultraviolet light sources 174C are alternately arranged at intervals of 60° along the imaginary circle C.

The radial dimension of the imaginary circle C is set in accordance with a distance from each of the white light sources 174B and each of the ultraviolet light sources 174C to the platen 122. In other words, in the present embodiment, the measurement position P as an intersection between the medium 101 on the platen 122 and the measurement optical axis L is irradiated with the light emitted from each of the white light sources 174B and each of the ultraviolet light sources 174C. It should be noted that in reality, a predetermined range centered on the measurement position P is irradiated with the light from the white light sources 174B and the ultraviolet light sources 174C. Here, in the present embodiment, the measurement by the spectrograph 17 is performed due to the method of 45° x:0° in the opto-geometric condition stipulated in JIS Z 8722 as a colorimetric standard. Specifically, in the present embodiment, the light from the white light sources 174B and the ultraviolet light sources 174C is input to the measurement position P at an incident angle of 45°±2°, and the light reflected in the measurement position P at 0°±1° in the normal direction is input to the light receiving element 173A along the measurement optical axis L. Therefore, it is preferable for each of the white light sources 174B and each of the ultraviolet light sources 174C to be disposed at a position where the distance from the measurement optical axis L is roughly the same in dimension as the distance from the white light source 174B or the ultraviolet light source 174C to the platen 122.

It should be noted that it is possible for the three ultraviolet light sources 174C to have the same emission spectrum, or have respective emission spectra different from each other. In the present embodiment, there is described the example in which the three ultraviolet light sources 174C have the same emission spectrum.

Configuration of Drive Control Section 176

The drive control section 176 controls drive of the spectrograph 17 based on a control command from the control unit 15.

The drive control section 176 is configured including an arithmetic circuit such as microcomputer, a storage circuit such as a memory, a variety of driver circuits and so on, and functions as a filter control section 176A, a light reception control section 176B, a light source switching section 176C and an arithmetic section 176D as shown in FIG. 2.

The filter control section 176A controls drive of the spectroscopic filter 172A to change the wavelength of the light to be transmitted through the spectroscopic filter 172A.

The light reception control section 176B controls drive of the light receiving element 173A to receive a light reception signal output when the light receiving element 173A has received the light.

The light source switching section 176C switches between combinations of the light sources to be put on or off out of the plurality of white light sources 174B and the plurality of ultraviolet light sources 174C.

FIG. 5 shows a pattern example of the light source combinations in the present embodiment. It should be noted that in FIG. 5, "ON" means lighting, and "OFF" means extinction.

In the present embodiment, the light source switching section 176C puts on or off the white light sources 174B and the ultraviolet light sources 174C with any one of the combinations shown in FIG. 5.

Among these combinations, the combinations a through c are each a combination of putting one of the light sources on while putting the other of the light sources off. Specifically, the combination a is a combination of putting on the first white light source 174B1 out of the three white light sources 174B, and putting the other light sources off. The combination b is a combination of putting on the second white light source 174B2 out of the three white light sources 174B, and putting the other light sources off. The combination c is a combination of putting on the third white light source 174B3 out of the three white light sources 174B, and putting the other light sources off.

Further, the combination d is a combination of putting on all of the light sources, namely the three white light sources 174B and the three ultraviolet light sources 174C.

The arithmetic section 176D calculates the spectral reflectivity of the medium 101 based on the light reception signal output from the light receiving element 173A. It should be noted that the light reception signal corresponds to a spectroscopic measurement result obtained by measuring the intensity of the light with the spectral wavelength using the spectroscopic measurement section constituted by the spectroscopic filter 172A and the light receiving element 173A.

The arithmetic section 176D calculates the spectral reflectivity of the medium 101 based on the spectroscopic measurement result with respect to a plurality of wavelengths when switching the measurement position P in the medium 101 and the combination of the white light sources 174B and the ultraviolet light sources 174C to be put on or off. On this occasion, the arithmetic section 176D calculates partial spectral reflectivities from the respective spectroscopic measurement results, and then combines these partial spectral reflectivities with each other to calculate the spectral reflectivity with respect to each wavelength.

Here, the combining method of the partial spectral reflectivities in the present embodiment will be described using an example shown in FIG. 6 and FIG. 7.

FIG. 6 is a diagram showing an example of the partial spectral reflectivity calculated from the spectroscopic measurement result with respect to each wavelength. FIG. 7 shows the spectral reflectivity obtained when combining the partial spectral reflectivities shown in FIG. 6 with each other.

In the present example, the spectroscopic measurement with respect to n wavelengths λi (i=1 through n) is performed while changing the measurement position P to four places of P1 through P4, and changing the light source combination between the light source combinations a through c. Thus, as shown in FIG. 6, there are obtained 12 partial spectral reflectivities x ([P1, P2, P3, P4], [a, b, c],λi) for each of the wavelengths λi. Hereinafter, the partial spectral reflectivities x ([P1, P2, P3, P4],[a, b, c],λi) are abbreviated as partial spectral reflectivities xi in some cases.

The arithmetic section 176D calculates an average partial spectral reflectivity $x_{avi}$ as an average value of the 12 partial spectral reflectivities xi with respect to each of the wavelengths λi. Further, the arithmetic section 176D calculates a standard deviation $\sigma_i$ of the 12 partial spectral reflectivities with respect to each of the wavelengths λi.

Further, the arithmetic section 176D calculates the spectral reflectivities $A_j$ obtained by combining the 12 partial spectral reflectivities xi using the following formulas (1), (2). The spectral reflectivities $A_j$ includes $A_i$ and $A_{i+n}$ as shown in formulas (1), (2).

$$A_j = A_i = x_{avi} + k\sigma_i \quad (1)$$

$$A_j = A_{i+n} = x_{avi} - k\sigma_i \quad (2)$$

In the formulas (1), (2) described above, the coefficient k is a parameter representing how much variation range is to be included in the spectral reflectivities $A_j$ with respect to the average partial spectral reflectivity $x_{avi}$, and an arbitrary value can be set to the coefficient k as one of the parameters for controlling the performance of the discrimination. For example, in the present embodiment, the coefficient k is assumed as k=3.

As shown in the formulas (1), (2) and FIG. 7, in the present embodiment, the two spectral reflectivities $A_i$, $A_{n+i}$ are calculated from the 12 partial spectral reflectivities xi. In other words, it results in that the 2n spectral reflectivities $A_j$ corresponding to j=1 through 2n can be obtained with respect to the n measurement spectral wavelengths. Here, in order to distinguish the spectral reflectivities $A_i$ and the spectral reflectivities $A_{i+n}$ from each other as data, the spectral reflectivities $A_j$ corresponding to the wavelength variable i for specifying the wavelength λi in a range of i=1 through n are defined as the spectral reflectivities $A_i$, and the spectral reflectivities $A_j$ corresponding to a range of i=n+1 through 2n are defined as the spectral reflectivities $A_{i+n}$. The wavelength λi and the wavelength λi+n represent the same wavelength.

Configuration of Control Unit 15

As shown in FIG. 2, the control unit 15 is configured including an I/F 151, a unit control circuit 152, a memory 153 and a central processing unit (CPU) 154.

The I/F 151 inputs print data, which is input from the external equipment 20, to the CPU 154.

The unit control circuit 152 is provided with control circuits for respectively controlling the supply unit 11, the conveying unit 12, the printing section 16, the spectrograph 17 and the carriage moving unit 14, and controls the operations of the respective units based on the command signal from the CPU 154. It should be noted that it is also possible for the control circuits for the respective units to be disposed separately from the control unit 15, and to be connected to the control unit 15.

The memory 153 stores a variety of programs and a variety of types of data for controlling the operation of the printer 10.

As the variety of types of data, there can be cited, for example, a drive table representing control values of the spectroscopic filter 172A with respect to the light to be transmitted through the spectroscopic filter 172A, and printing profile data storing an ejection amount of the ink corresponding to each of the color data included as the print data.

The CPU 154 reads and executes the variety of programs stored in the memory 153 to thereby control drive of the respective constituents of the printer 10. Further, the CPU 154 reads and executes the variety of programs stored in the memory 153 to thereby function as a printing control section 154A, a colorimetric section 154B, a type discrimination section 154C, a calibration section 154D and so on.

The printing control section 154A controls drive of the printing section 16 based on, for example, a print command including image information input from the outside and the printing profile data stored in the memory 153 to thereby print an image on the medium 101.

The colorimetric section 154B measures the color of the medium 101 based on the spectral reflectivity calculated by the spectrograph 17. For example, the colorimetric section 154B calculates a color difference between each of the reference colors and the medium 101 based on reflectivity data of a plurality of reference colors stored in the memory 153 and the spectral reflectivity at a predetermined position of the medium 101 calculated by the spectrograph 17.

The type discrimination section 154C discriminates the type of the medium 101 based on the result of the spectroscopic measurement with respect to the medium 101 on which the image has not yet been printed, the spectroscopic measurement being performed by the spectrograph 17.

Specifically, in the present embodiment, the memory 153 stores sample data based on the spectroscopic measurement result with respect to a plurality of reference samples. The sample data is the data calculated based on the spectroscopic measurement result obtained when performing the spectroscopic measurement processing on the plurality of reference samples at a plurality of measurement positions P while switching the light source combination between the plurality of combinations. On the sample data, there are recorded average reflectivity data avA with respect to the respective wavelengths λi, and covariance data R of the partial spectral reflectivity calculated based on the spectroscopic measurement result. It should be noted that the detailed explanation with respect to the sample data will be described later. Further, the type discrimination section 154C calculates a statistic amount such as the Mahalanobis' generalized distance with respect to the medium 101 using the spectral reflectivity based on the result of the spectroscopic measurement performed on the medium 101, and the sample data. Further, the type discrimination section 154C detects the reference sample in which the statistic amount such as the Mahalanobis' generalized distance thus calculated becomes the minimum to thereby identify the type of the medium 101.

As described above, by discriminating the type of the medium 101, it is possible for the printing section 16 to perform the print processing with reference to the printing profile data corresponding to the type of the medium 101 thus discriminated.

The calibration section 154D updates the printing profile based on the colorimetric result by the colorimetric section 154B.

In the update of the printing profile, for example, a test pattern formed of a predetermined plurality of colors of color patches is printed on the medium 101, and then the spectroscopic measurement processing is performed on each of the color patches by the spectrograph 17. On this occasion, the arithmetic section 176D calculates the spectral reflectivity x(P,d,λi) using the color patches as the measurement positions P based on the spectroscopic measurement result when the spectroscopic measurement processing is performed setting the light source combination to the combination d. In the combination d, since the measurement position P is irradiated with the white light from the plurality of white light sources 174B disposed so as to surround the measurement position P, it is difficult to cause a shadow even when surface irregularity exists in the medium 101. In other words, in the spectral reflectivity x(P,d,λi) with respect to the combination d, the influence of the shadow due to the surface irregularity of the medium 101 is suppressed, and thus, the spectral reflectivity x(P,d,λi) becomes an optimum value as the spectral reflectivity for the colorimetry when performing the colorimetry of the medium 101. Therefore, it is possible for the colorimetric section 154B to detect how much the color of the printed image is different from the original image by calculating the color difference based on, for example, the reference reflectivity of the original image of the color patches stored in advance in the memory 153 and the spectral reflectivity for the colorimetry. Thus, it is possible for the calibration section 154D to update the printing profile data so that the color difference calculated as described above becomes small.

Type Discrimination Method of Medium 101 in Printer 10

Then, the type discrimination method of the medium 101 in such a printer 10 as described above will be described.

In the present embodiment, the type of the medium 101 is discriminated before performing the print processing on the medium 101, and then the printing section 16 performs the print processing based on the printing profile data corresponding to the type of the medium 101.

When performing the processing of discriminating the type of the medium 101, in the present embodiment, there is used the sample data stored in the memory 153. The sample data can also be stored in the memory 153 in advance when manufacturing the printer 10, or can also be created by preparing a sample used by the user as a reference, and then measuring the sample.

Firstly, a method of generating the sample data will be described.

In the generation of the sample data, the spectroscopic measurement processing with the light source combination pattern changed is performed on a plurality of samples the same in type at a plurality of measurement positions P.

FIG. 8 is a diagram showing an example of the partial spectral reflectivities obtained from a plurality of sample media 101. Further, FIG. 9 is a diagram showing the spectral reflectivities as a result of combining such partial spectral reflectivities as shown in FIG. 8 with each other. It should be noted that in FIG. 8, $x(T1,L1,P1,a,\lambda1)$ represents the partial spectral reflectivity of the spectral wavelength "λ1" when performing the spectroscopic measurement on the medium 101 of the type "T1" as the lot sample "L1" at the measurement position "P1" using the light sources of the combination "a." Further, in FIG. 9, $x_{av1}(T1,L1)$ represents an average partial spectral reflectivity obtained by averaging the partial spectral reflectivities with respect to the wavelength "λ1" of the medium 101 of the type "T1" as the lot sample "L1." In FIG. 9, $\sigma_i(T1,L1)$ represents the standard deviation of the partial spectral reflectivities with respect to the wavelength "λ1" of the medium 101 of the type "T1" as the lot sample "L1."

As shown in FIG. 8, in the spectroscopic measurement processing with respect to the samples, the spectroscopic measurement processing is performed as many times as the product of the number M of the measurement positions P, the number Q of the light source combinations, and the number n of the wavelengths switched in the spectroscopic measurement for each sample. Further, in the generation of the sample data, such spectroscopic measurement as described above is performed using a plurality of samples the same in type. Therefore, as shown in FIG. 8, the partial spectral reflectivities are calculated as many as the number of the spectroscopic measurement results obtained by the spectroscopic measurement processing.

Then, by combining the plurality of partial spectral reflectivities xi obtained for each of the wavelengths λi (i=1 through n) with each other for each sample, the spectral reflectivities $A_j$ are calculated. In the calculation of the spectral reflectivities $A_j$, the average partial spectral reflectivity $x_{avi}$ and the standard deviation σi are calculated, and are then substituted in the formulas (1), (2) described above for each of the wavelengths λi. Thus, the spectral reflectivities $A_i$, $A_{i+n}$ are calculated for each of the wavelengths λi. In other words, it results in that the 2n spectral reflectivities $A_j$ (j=1 through 2n) are calculated from such partial spectral reflectivities xi with respect to the n wavelengths λi as shown in FIG. 8.

It should be noted that in the example shown in FIG. 9, there is shown an example in which the spectral reflectivities $A_i$ are stored as the data corresponding to the wavelength variable i for specifying the wavelength λi in a range of i=1 through n, and the spectral reflectivities $A_{i+n}$ are stored as the data corresponding to a range of i=n+1 through 2n in order to distinguish the spectral reflectivities $A_i$ and the spectral reflectivities $A_{i+n}$ from each other as the data.

Further, the partial spectral reflectivities xi combined with each other here can be all of the partial spectral reflectivities xi obtained with respect to the wavelength λi for each sample as shown in FIG. 9, but it is also possible to section the partial spectral reflectivities xi into a plurality of groups, and then calculate the partial spectral reflectivities xi group by group. For example, it is also possible to section the partial spectral reflectivities into groups each corresponding to four measurement positions, and then calculate the spectral reflectivities of the respective groups. In this case, the spectral reflectivities $A_i$, $A_{i+n}$ are calculated from the plurality of partial spectral reflectivities $x_i([P1, P2, P3, P4],[a, b, c],\lambda i)$ obtained with respect to the measurement positions P1 through P4, and the spectral reflectivities $A_i$, $A_{i+n}$ are also calculated from the partial spectral reflectivities $x_i([P5, P6, P7, P8],[a, b, c],\lambda i)$.

The sample data is calculated based on the spectral reflectivities $A_j$ after the combination obtained in such a manner as described above. FIG. 10 is a diagram showing an example of the sample data.

As shown in FIG. 10, the sample data have average reflectivity data avA and covariance data R.

The average reflectivity data avA includes average spectral reflectivity $avA_j$ obtained by averaging the spectral reflectivities $A_j$ with respect to each of the wavelength variable j obtained with respect to the plurality of samples of the medium 101 the same in type. Specifically, the average reflectivity data avA become a matrix including 2n elements of $avA=(avA_1, avA_2, avA_3, \ldots avA_{2n})$.

Further, the covariance data R is substantially the same as the covariance information disclosed in, for example, Document 1, and is a matrix representing a relationship of the measurement value between different wavelengths. The covariance data R is recorded as, for example, a correlation coefficient obtained by obtaining a covariance value by averaging the products of the deviation between the two wavelength variables to be compared, and then dividing the covariance value by a product of the standard deviations.

Then, there will be described a type discrimination processing of the medium 101 including the measurement processing (a measurement method) of the medium 101 by the spectrograph 17. The type discrimination processing of the medium 101 is performed before, for example, the print processing for forming an image on the medium 101.

Figure 11:
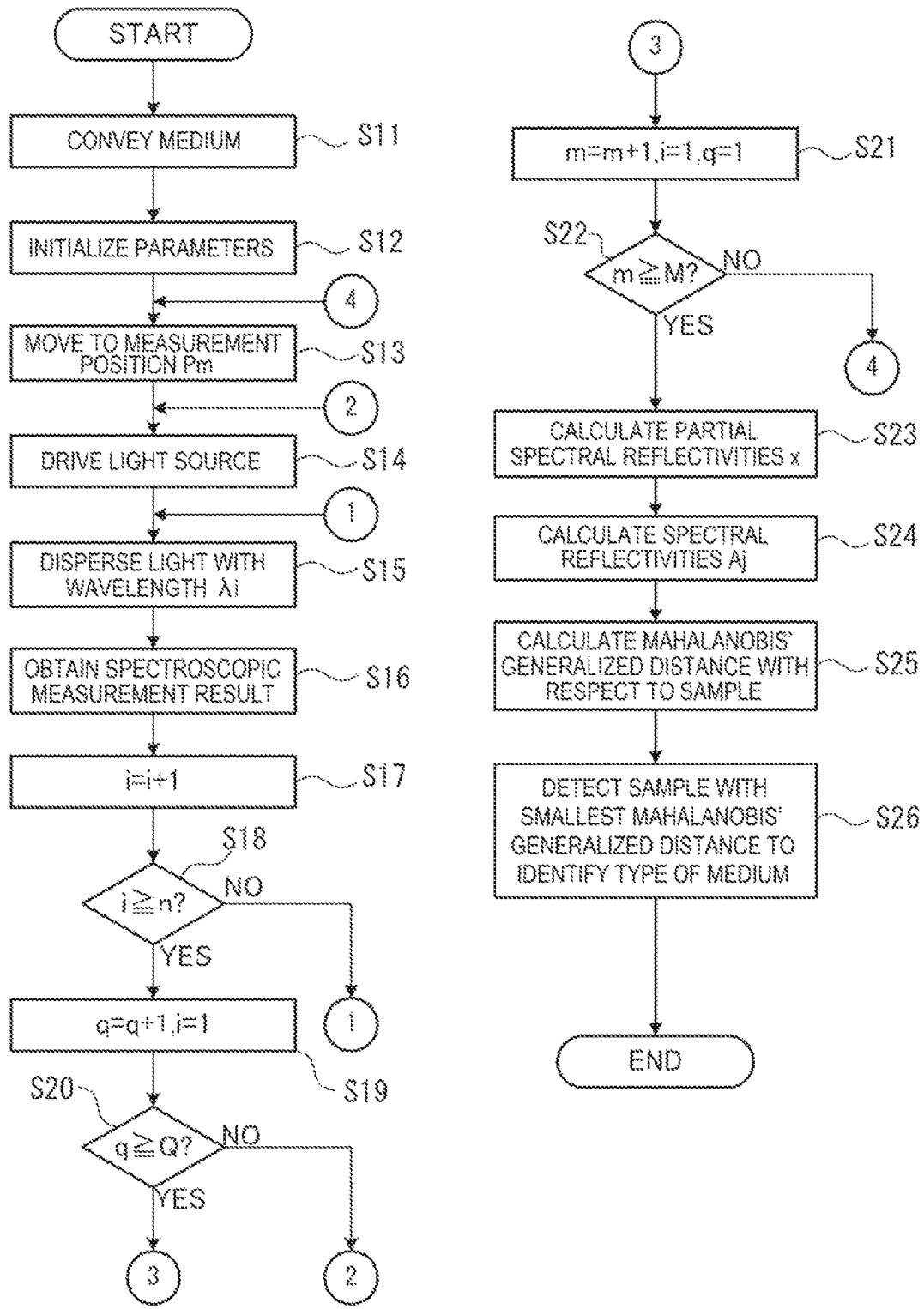
FIG. 11 is a flowchart showing medium type discrimination processing of the present embodiment.

FIG. 11 is a flowchart showing the type discrimination processing of the medium 101 according to the present embodiment.

For example, when the user sets the medium 101 in the printer 10, and the command signal for instructing the printing of the medium 101 is input to the printer 10, the control unit 15 executes the step S11. In the step S11, the control unit 15 drives the supply unit 11 and the conveying unit 12 to convey the medium 101 to a surface of the platen 122.

Then, the drive control section 176 of the spectrograph 17 executes the step S12 for initializing the variety of parameters for performing the spectroscopic processing. Specifically, the drive control section 176 sets a position variable m representing the measurement position P to m=1, sets a light source variable q representing the pattern of the light source combination to q=1, and sets the wavelength variable i representing the spectral wavelength to i=1. It should be noted that the light source variable q corresponds to the pattern of the light source combination shown in FIG. 5, wherein q=1 corresponds to the combination a, q=2 corresponds to the combination b, and q=3 corresponds to the combination c.

Then, the drive control section 176 outputs a moving request of moving the carriage 13 to a position corresponding to the measurement position Pm to the control unit 15. Thus, the control unit 15 controls the conveying unit 12 and the carriage moving unit 14 to execute the step S13 for moving the spectrograph 17 to the position corresponding to the measurement position Pm.

Subsequently, the light source switching section 176C executes the step S14 for controlling the light source section 174 to put on or off the white light sources 174B and the ultraviolet light sources 174C with the combination corresponding to the light source variable q. The step S14 corresponds to a light source switching step.

Subsequently, the filter control section 176A controls the spectroscopic filter 172A to execute the step S15 for dispersing the light with the wavelength $\lambda i$. Further, the light reception control section 176B executes the step S16 for obtaining the spectroscopic measurement result as the light reception signal output from the light receiving element 173A having received the light thus dispersed. The drive control section 176 stores the spectroscopic measurement result thus obtained in the storage circuit incorporated in the spectrograph 17 in conjunction with the position variable m, the light source variable q and the wavelength variable i.

Subsequently, the drive control section 176 executes the step S17 for adding 1 to the wavelength variable i, and further executes the step S18 for determining whether or not the wavelength variable i becomes equal to or larger than the maximum value n. When NO is determined in the step S18, the drive control section 176 returns to the step S15 to perform the spectroscopic measurement processing on the next wavelength $\lambda i$.

When YES is determined in the step S18, namely when the spectroscopic measurement results of the light with all of the wavelengths from the wavelength $\lambda 1$ to the wavelength $\lambda n$ have been obtained, the drive control section 176 adds 1 to the light source variable q, then executes the step S19 for initializing the wavelength variable i, and then executes the step S20 for determining whether or not the light source variable q has become a predetermined maximum value Q. When NO is determined in the step S20, the drive control section 176 returns to the step S14 to perform the spectroscopic measurement processing with the light source combination switched.

When YES is determined in the step S20, the drive control section 176 adds 1 to the position variable m, and executes the step S21 for initializing the wavelength variable i and the light source variable q, and further executes the step S22 for determining whether or not the position variable m has become equal to or larger than a predetermined maximum value M. When NO is determined in the step S22, the drive control section 176 returns to the step S13 to perform the spectroscopic measurement processing with the light source combinations at the next measurement position Pm.

When YES is determined in the step S22, the arithmetic section 176D of the drive control section 176 executes the step S23 for calculating such partial spectral reflectivities xi as shown in FIG. 6 from the spectroscopic measurement results thus obtained. Further, the arithmetic section 176D executes the step S24 for calculating the average partial spectral reflectivities $x_{avi}$ and the standard deviation $\sigma_i$, and then combining the partial spectral reflectivities xi with each other using the formulas (1), (2) to calculate such spectral reflectivities $A_j$ as shown in FIG. 7 for each of the wavelengths $\lambda i$. Then, the drive control section 176 outputs the spectral reflectivities $A_j$ thus calculated to the control unit 15. The step S23 and the step S24 correspond to an arithmetic step.

The colorimetric section 154B of the control unit 15 executes the step S25 for calculating the Mahalanobis' generalized distance with respect to the type of the sample using the spectral reflectivities $A_j$ input from the spectrograph 17 and the sample data recorded on the memory 153. It should be noted that on the memory 153, there is recorded the sample data with respect to a plurality of types of samples. Therefore, the colorimetric section 154B calculates the Mahalanobis' generalized distance with respect to each of the types of the samples.

Then, the type discrimination section 154C executes the step S26 for detecting the type of the sample in which the Mahalanobis' generalized distance which has been calculated with respect to each of the types of the samples becomes the minimum to thereby identify the type of the medium 101.

After such type discrimination processing of the medium 101 as described above, the printing control section 154A retrieves the printing profile data corresponding to the type thus identified in the step S24, and controls the printing section 16 to print the image on the medium 101.

Functions and Advantages of Present Embodiment

The spectrograph 17 installed in the printer 10 according to the present embodiment is provided with the plurality of white light sources 174B having the same emission spectrum and emitting the light toward the medium 101 as the measurement object, and the spectroscopic filter 172A and the light receiving element 173A constituting the spectroscopic measurement section for performing the spectroscopic measurement on the light reflected by the medium 101. Further, the spectrograph 17 is provided with the drive control section 176, and the drive control section 176 functions as the light source switching section 176C and the arithmetic section 176D. The light source switching section 176C switches between combinations of the light sources to be put on or off out of the plurality of white light sources 174B. Further, the arithmetic section 176D calculates the spectral reflectivities $A_j$ of the medium 101 based on the spectroscopic measurement results when putting on or off the plurality of white light sources 174B with a plurality of combinations.

When inputting the white light, the reflectivity of the light with each wavelength reflected by the medium 101 also varies due to the shape or the grain size of the surface irregularity existing in the medium 101. Therefore, when inputting the white light from a single direction to perform the spectroscopic measurement, there occurs a variation in the spectroscopic measurement result. In other words, even when measuring the same medium 101, the intensity of the light reflected by the surface irregularity varies depending on the measurement position P.

In contrast, in the present embodiment, the spectroscopic measurement is performed while switching the combination of the white light sources 174B to be put on or off. In this case, even when the surface irregularity exists in the medium 101, by varying the incident direction of the light to the surface irregularity, the shadow caused by the surface irregularity also varies, and thus, it is possible to measure how much the spectroscopic measurement result when irradiating the medium 101 with the light varies. Therefore, it is possible to calculate the spectral reflectivities with consideration for the measurement variation due to the surface irregularity of the medium 101 from the respective spectroscopic measurement results when switching the light source combination to the plurality of combinations.

In the spectrograph 17 according to the present embodiment, the arithmetic section 176D calculates the plurality of partial spectral reflectivities xi corresponding to the respective spectroscopic measurement results when changing the light source combination, and then combines the plurality of partial spectral reflectivities xi with each other to calculate the spectral reflectivities $A_j$ of the measurement object.

By changing the light source combination, the shadow caused by the surface irregularity of the medium 101 also changes, and therefore, a variation occurs in the spectroscopic measurement result as described above. In the present embodiment, since the spectral reflectivities are calculated by combining these spectroscopic measurement results with each other, it is possible to calculate such spectral reflectivities with consideration for the influence of the variation due to the surface irregularity as described above.

Further, in the present embodiment, the arithmetic section 176D calculates the spectral reflectivities based on the formulas (1), (2). Specifically, the arithmetic section 176D adds and subtracts the standard deviation σi representing the variation of the spectroscopic measurement result due to the surface irregularity of the medium 101 to and from the average partial spectral reflectivities $x_{avi}$ with respect to each of the wavelengths λi to thereby calculate the spectral reflectivities $A_i$, $A_{i+n}$. Thus, it is possible to obtain the data of the spectral reflectivities twice as many as the number of times of the spectroscopic measurement performed in the spectroscopic measurement processing. In this case, when discriminating the type of the medium 101 based on the spectral reflectivities $A_j$, it is possible to perform accurate discrimination processing based on a large number of data.

Further, in the formulas (1), (2), the average partial spectral reflectivity $x_{avi}$ is the reflectivity based on the true color the medium 101 has, and the standard deviation $\sigma_i$ represents a variation of the reflectivity due to the shadow caused by the surface irregularity of the medium 101. In other words, in the present embodiment, it is possible to calculate the spectral reflectivities $A_j$ with consideration for the extent of the variation of the spectroscopic measurement result due to the shadow caused by the surface irregularity of the medium 101.

Further, in the spectrograph 17 according to the present embodiment, the measurement position P in the medium 101 measured by the spectrograph 17 is changed to a plurality of positions, and the spectroscopic measurement processing is performed while switching the light source combination with respect to each of the measurement positions. Thus, the number of data of the partial spectral reflectivities, which are the original data when calculating the spectral reflectivities $A_j$, increases, and thus, it is possible to calculate the spectral reflectivities $A_j$ higher in accuracy.

In the spectrograph 17 according to the present embodiment, there are included the combinations a through c each for putting on any one of the three white light sources 174B and putting off the other of the white light sources 174B as the light source combinations. The shadow caused by the surface irregularity when irradiating the medium 101 with the light becomes the darkest when inputting the light from a single direction, and the more the number of the white light sources 174B to be put on is increased, the lighter the shadow becomes. In the present embodiment, by performing the spectroscopic measurement processing while switching the combinations a through c in series, it is possible to accurately calculate the spectral reflectivities $A_j$ with consideration for the variation of the spectroscopic measurement result caused by the shadow.

By comparing such spectral reflectivities $A_j$ and the sample data with each other to obtain the statistic amount such as Mahalanobis' generalized distance, it is possible to accurately detect the level of the surface irregularity of the medium 101, and thus it is possible to accurately discriminate the type of the medium 101.

Further, in the printer 10 according to the present embodiment, the control unit 15 functions as the type discrimination section 154C to discriminate the type of the medium 101 based on the spectral reflectivities measured by the spectrograph 17.

As described above, the spectrograph 17 according to the present embodiment changes the light source combination to perform the spectroscopic measurement processing on each of the combinations to calculate the spectral reflectivities. In this case, it is possible for the arithmetic section 176D to calculate the spectral reflectivities with consideration for the extent of the variation of the spectroscopic measurement result due to the shadow caused by the surface irregularity of the medium 101. Therefore, by measuring such spectral reflectivities as described above with respect to the plurality of types of samples in advance and storing the result as the sample data, it is possible for the type discrimination section 154C to accurately discriminate the type of the medium 101 based on the spectral reflectivities $A_j$ obtained by the spectroscopic measurement processing of the medium 101 and the sample data.

MODIFIED EXAMPLES

It should be noted that the present disclosure is not limited to the embodiment described above, but includes modifications, improvements, and so on within a range where the advantages of the present disclosure can be achieved.

Modified Example 1

In the embodiment described above, the spectral reflectivities are calculated by combining all of the partial spectral reflectivities with respect to the combinations a through d, but this is not a limitation.

For example, in the embodiment described above, there are included the combinations a through c each for putting on one of the three white light sources 174B, and putting off the other of the white light sources 174B and the ultraviolet light sources 174C, and the combination d for putting on all of the white light sources 174B and the ultraviolet light sources 174C.

In this case, it is also possible to calculate first spectral reflectivities $A_{j1}$ obtained by combining the partial spectral reflectivities corresponding to the combinations a through c, and second spectral reflectivities $A_{j2}$ obtained by combining the partial spectral reflectivities based on the combination d separately from each other. In this case, the first spectral reflectivities $A_{j1}$ become the spectral reflectivities with consideration for the variation of the spectroscopic measurement result due to the surface irregularity of the medium 101, and are therefore suitable as the reflectivities used when performing the type discrimination of the medium 101 based on the surface irregularity of the medium 101. Further, by comparing the first spectral reflectivities $A_{j1}$ and the second spectral reflectivities $A_{j2}$ with each other, it becomes possible to calculate an amount of fluorescence component included in the medium 101, and in this case, it becomes possible to further improve the discrimination accuracy when performing the type discrimination of the medium 101.

Meanwhile, the second spectral reflectivities $A_{j2}$ become the reflectivities with the influence of the shadow due to the surface irregularity of the medium 101 suppressed, and are therefore suitable as the reflectivities used when performing the calibration processing by the calibration section 154D as described above. Specifically, when performing the colorimetry of the color of the image formed on the medium 101 or the true color the medium 101 has, it is preferable for the influence of the shadow to be removed. In this case, it is preferable to put on all of the white light sources 174B and the ultraviolet light sources 174C arranged at regular intervals on the imaginary circle C centered on the measurement optical axis L to thereby reduce the influence of the shadow due to the surface irregularity as much as possible.

Therefore, by calculating the second spectral reflectivities $A_{j2}$ based on the combination d in advance as described above, it becomes possible to perform the colorimetric processing high in accuracy using the second spectral reflectivities $A_{j2}$ when performing the colorimetry of the color of the medium 101 or the image separately from the type discrimination processing of the medium 101.

Modified Example 2

In the embodiment described above, there are illustrated such combinations a through d as shown in FIG. 5, but this is not a limitation. FIG. 12 is a diagram showing another example of the light source combinations.

In the example shown in FIG. 12, the combination e is a combination of putting the first white light source 174B1 and the first ultraviolet light source 174C1 on, and putting the other light sources off. The combination f is a combination of putting the second white light source 174B2 and the second ultraviolet light source 174C2 on, and putting the other light sources off. The combination g is a combination of putting the third white light source 174B3 and the third ultraviolet light source 174C3 on, and putting the other light sources off. The combination h is a combination of putting all of the three white light sources 174B on, and putting all of the three ultraviolet light sources 174C off.

According also to such combinations e through h, similarly to the embodiment described above, by putting the white light sources 174B on one by one in each of the combinations e through g, it is possible to calculate the spectral reflectivities with consideration for the measurement variation due to the influence of the surface irregularity included in the medium 101.

Further, similarly to Modified Example 1, by calculating the first spectral reflectivities $A_{j1}$ based on the combinations e through g and the second spectral reflectivities $A_{j2}$ based on the combination h and then comparing the first spectral reflectivities $A_{j1}$ and the second spectral reflectivities $A_{j2}$ with each other, it becomes possible to detect the presence or absence of the fluorescence component of the medium 101.

Further, although the combinations shown in FIG. 5 or FIG. 12 make it possible to detect the fluorescence component of the medium 101, when the detection of the fluorescence component of the medium 101 is not performed, it is also possible to perform the spectroscopic measurement processing with respect to the combinations a through c shown in FIG. 5 without performing the spectroscopic measurement processing with respect to the combination d. Alternatively, it is also possible to perform the spectroscopic measurement processing with respect to the combinations e through g shown in FIG. 12 without performing the spectroscopic measurement processing with respect to the combination h.

Modified Example 3

In the embodiment described above, there is described the example in which the three ultraviolet light sources 174C have the same emission spectrum, but it is also possible for the these ultraviolet light sources 174C to have respective emission spectrums different from each other. For example, it is also possible to adopt a configuration of including a first excitation light source for outputting first excitation light for emitting a first fluorescence color, a second excitation light source for outputting second excitation light for emitting a second fluorescence color, and a third excitation light source for outputting third excitation light for emitting a third fluorescence color.

In this case, it is also possible to further add, for example, a combination of making the three while light sources 174B and the first excitation light source emit light, a combination of making the three while light sources 174B and the second excitation light source emit light, and a combination of making the three while light sources 174B and the third excitation light source emit light as the light source combinations. Thus, it becomes possible to also discriminate the type of the fluorescence component included in the medium 101, and it is possible to further improve the accuracy of the type discrimination processing of the medium 101.

Modified Example 4

In the embodiment described above, there is described the example in which the white light sources 174B are arranged at regular angular intervals along the imaginary circle C, but this is not a limitation. For example, it is also possible to adopt a configuration in which the imaginary circle C is sectioned by a straight line passing through the measurement optical axis L into two areas, and the white light sources 174B are disposed only on one of semicircular parts in the respective areas.

Modified Example 5

There is shown the example in which the number of the white light sources 174B, or the ultraviolet light sources 174C installed in the spectrograph 17 is three, but the number is not limited as long as the configuration is provided with a plurality of white light sources 174B the same in type.

For example, it is also possible to adopt a configuration provided with two white light sources 174B and one ultraviolet light source 174C. In this case, since the number of data of the partial spectral reflectivities calculated from the spectroscopic measurement result decreases, it is preferable to increase the number of the measurement positions P.

Further, it is also possible to adopt a configuration provided with four or more white light sources 174B. In this case, it is possible to further increase the light source combinations to calculate the spectral reflectivities higher in accuracy based on a larger number of spectroscopic measurement results.

Further, in the embodiment described above, it is assumed that the combinations a through c are each a combination of putting one of the light sources on while putting the other of the light sources off, but this is not a limitation. It is also possible to adopt a combination of putting a predetermined number of light sources on out of the plurality of white light sources 174B, and putting the other of the light sources off. In this case, since the intensity of the light with which the measurement position P is irradiated is increased, it becomes possible to suppress an influence of a noise component.

Modified Example 6

In the embodiment described above, the spectroscopic measurement processing with the light source combination changed is performed with respect to the plurality of measurement positions Pm of the medium 101, but it is also possible to perform the spectroscopic measurement processing with respect to a single measurement position P.

For example, by adopting a configuration of disposing four or more white light sources 174B, and increasing the patterns of the light source combination, it is possible to obtain a larger number of spectroscopic measurement results to calculate the spectral reflectivities high in accuracy even when the number of the measurement positions P is small. In this case, the white light sources 174B to be put on are preferably the white light sources 174B adjacent to each other along the imaginary circle C.

Modified Example 7

In the embodiment described above, the printer 10 is illustrated as the electronic apparatus, but this is not a limitation.

It is also possible to install the spectrograph 17 as the measurement device to an electronic apparatus not performing measurement of a color or the like of the medium 101 such as a recycling paper manufacturing machine for dissolving printed paper to recycle the printed paper as recycling paper, or a paper shredder device for cutting a paper sheet. In this case, since the colorimetric processing is not performed, it is possible to arrange the plurality of white light sources 174B in the semicircular part of the imaginary circle C as described in Modified Example 4, and thus, the degree of freedom of the light source arrangement is enhanced. Further, when the colorimetry of the medium 101 is not performed, since such a combination of putting all of the light sources on as the combination d can be made unnecessary, it is possible for the spectrograph 17 to perform prompt spectroscopic measurement processing.

Besides the above, a specific structure to be adopted when putting the present disclosure into practice can arbitrarily be replaced with another structure and so on within the range in which the advantages of the present disclosure can be achieved.

What is claimed is:

1. A measurement device comprising:
a plurality of light sources configured to emit first light toward a measurement object, and having a same emission spectrum;
a spectroscopic filter configured to receive second light reflected by the measurement object irradiated with the first light to output third light with a spectral wavelength;
a light receiving element configured to receive the third light to output a light reception signal;
a light source switching section configured to switch a plurality of combinations of the light sources to be put on or off out of the plurality of light sources; and
an arithmetic section configured to calculate a spectral reflectivity of the measurement object based on the reception signal when switching the plurality of light sources between the plurality of combinations.

2. The measurement device according to claim 1, wherein the arithmetic section calculates a partial spectral reflectivity corresponding to each of the plurality of combinations based on the light reception signal corresponding to each combination, and combines a plurality of the partial spectral reflectivities corresponding to the plurality of combinations with each other to calculate the spectral reflectivity.

3. The measurement device according to claim 2, wherein the arithmetic section defines an average value of the partial spectral reflectivities xi with respect to a wavelength $\lambda i$ as $x_{avi}$, and a standard deviation of the partial spectral reflectivities xi with respect to the wavelength $\lambda i$ as $\sigma i$, and calculates the spectral reflectivities with respect to the wavelength $\lambda i$ as $A_i = x_{avi} + k\sigma_i$, and $A_{i+n} = x_{avi} - k\sigma i$.

4. The measurement device according to claim 1, wherein the arithmetic section calculates the spectral reflectivity based on the light reception signal obtained when switching the plurality of combinations with respect to a plurality of measurement positions included in the measurement object.

5. The measurement device according to claim 1, wherein the plurality of combinations include the combination of putting any one of the light sources on and putting the other of the light sources off.

6. An electronic apparatus comprising:
the measurement device according to claim 1; and
a type discrimination section configured to discriminate a type of the measurement object based on the spectral reflectivity measured by the measurement device.

7. A measurement method of a measurement device including
a plurality of light sources configured to emit first light toward a measurement object, and having a same emission spectrum;
a spectroscopic filter configured to receive second light reflected by the measurement object irradiated with the first light to output third light with a spectral wavelength;
a light receiving element configured to receive the third light to output a light reception signal;
the method comprising:
switching a plurality of combinations of the light sources to be put on or off out of the plurality of light sources; and
calculating a spectral reflectivity of the measurement object based on the reception signal when switching the plurality of light sources between the plurality of the combinations.

* * * * *